April 11, 1950  F. R. CHESTER  2,503,435
FASTENING CLIP AND THE LIKE
Filed Sept. 23, 1946

INVENTOR.
FRANK R. CHESTER
BY
William B. Hall
ATTORNEY.

Patented Apr. 11, 1950

2,503,435

UNITED STATES PATENT OFFICE 2,503,435

FASTENING CLIP AND THE LIKE

Frank R. Chester, Santa Monica, Calif.

Application September 23, 1946, Serial No. 698,785

3 Claims. (Cl. 24—137)

My present invention relates to a fastening clip, and more particularly to a clip sometimes referred to as a clothes-pin.

One of the principal objects of this invention is to provide a fastening clip of this class which is particularly simple and economical of construction, durable, which will not readily deteriorate or get out of order.

Another important object of this invention is to provide a clip of this class which will tightly fasten clothes, or the like, to a clothes-line, or other support, one in which the clamping jaws may be separated a considerable distance, and one which may be easily fastened over clothes, or the like, and also easily removed therefrom.

An important object also of this invention is to provide a clip of this class which may be readily made of a resilient band of one piece and folded upon itself intermediate its ends providing legs which may be readily secured together near their free ends, forming gripping jaws at the free ends, which jaws may be readily separated by compressing or contracting the portions of the legs backwardly from the connected portions.

A further important object of this invention is to provide a fastening clip of this class which is similarly operated, but which is provided with a supporting hook or other gripping or holding means at one end so that the clamped article gripped by the gripping jaws may be supported from various holders.

With these and other objects in view, as will appear hereinafter, I have devised a clothes-pin having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1:
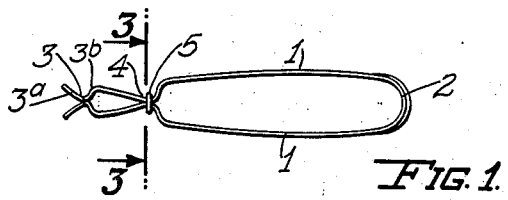
Fig. 1 is a side view of my fastening clip in one form, showing by dotted lines the position of the finger-gripping portion of the clip and the expanded article-gripping jaws.
Figure 3:
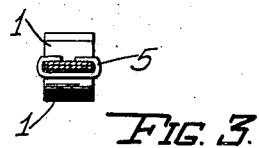
Fig. 3 is an enlarged sectional view thereof, taken through 3—3 of Fig. 1.

The principal element of the device shown in Fig. 1 is made from a single metallic strap which may be approximately one-quarter of an inch (¼") to three-eighths of an inch (⅜") wide, and fourteen-thousandths of an inch (.014") to eighteen-thousandths of an inch (.018") thick, and is preferably made from hard stainless steel.

It is folded upon itself intermediate its ends forming opposed legs 1, the fold 2 being about a relatively wide radius. At the free ends of the legs are gripping jaws 3 which are flared upwardly at their ends as indicated by 3ª. At the inner sides of the jaws are relatively abrupt portions 3ᵇ for forming shoulders for effectively retaining clothing on a clothes-line, or for similar purposes. Between the jaws and the connected ends of the legs are inwardly bent beads 4, which are positioned transversely of the longitudinal extent of the legs and provide pivot portions which are opposed to each other. These pivot portions are positioned relatively closer to the jaws than to the opposite connected ends of the legs. These beads provide at their outer sides transverse grooves, as shown.

The free ends of the legs are secured together by a wire loop 5, which extends transversely of the legs and through the grooves. When the jaws 3 engage each other, the pivot portions are normally separated a slight distance, but when the wire loop or staple 5 is secured in position, the pivot portions substantially engage each other and hold the jaws 3 tightly against each other. The wire loop or staple is relatively loose so that the rounded pivot portions may conveniently roll on each other permitting the wire loop or staple to move longitudinally with respect to the legs, so that the pivot portions may substantially engage each other at all times.

Contraction of the portions of the legs between the pivot portions and the connected ends, causes the jaw members 3ª to separate for placing the jaws around the article to be gripped. The clip may be removed in the same manner by contracting the legs. However, the clip may be readily placed over the article to be gripped by forcing the same over such article, the flared portions 3ª facilitating such fastening.

Figure 2:
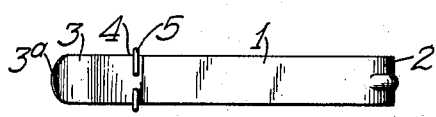
Fig. 2 is a top view thereof.

The connecting portion 2 is constructed so that it may not readily bend or collapse. This is done by providing a reinforcing rib in such connecting portion, as shown in Figs. 1 and 2.

Figure 4:
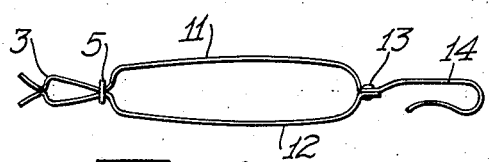
Fig. 4 is a side view of my clip in a slightly modified form of construction, showing the same provided with a supporting hook.

In the structure shown in Fig. 4, the clip is made of two similar straps, designated 11 and 12. The end of the member 12 opposite the jaw is connected by a rivet or wire loop or staple 13, or by any other suitable means, to the intermediate portion of the member 11, forming connecting legs, as described above. In this instance, however, the strap element 11 is extended beyond the portion fastened to the end of the element 12, and provides a hook 14 for supporting the clip on a clothes-line or other suitable holder.

Figure 5:
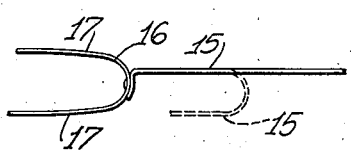
Fig. 5 is a fragmentary portion of another fastening clip, also provided with a supporting hook.

In the modification shown in Fig. 5, a hook 15 is secured in any suitable manner, such as by welding, to the connecting portion 16 of the two legs 17, which correspond with the legs 1 shown in Fig. 1. Such construction permits the hook 15 to be made of malleable material, so that the clip may be bent to fit or folded over the holding or supporting device for the clip.

Figure 6:
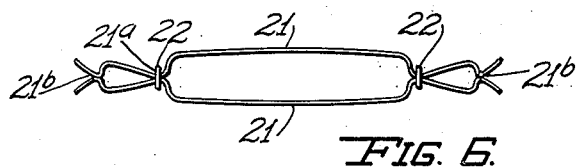
Fig. 6 is a modified form of my fastening clip having interchangeable article-gripping or clip-holding means at its opposite ends; and, Fig. 7 is a modified form of construction for performing the functions of the device shown in Fig. 6.

The modification, shown in Fig. 6, shows the clip as made of identical strap elements 21, and the same are fastened together near their end portions by wire loops or staples 22 in the same manner, as described above in connection with Fig. 1. This construction provides pivot portions 21ª near the opposite ends and jaws 21ᵇ at the opposite ends. Thus, when the portions of the elements between the pivot portions are contracted, both pairs of jaws are separated for both clamping the article and the supporting means.

Figure 7:
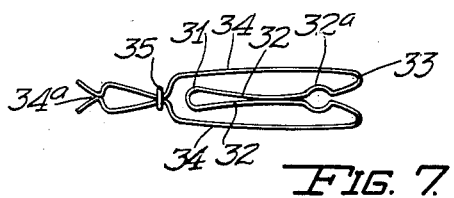

In the modification shown in Fig. 7, the device is also made from a single strap which is folded upon itself at 31 providing legs 32, which are again folded backwardly upon themselves at 33, providing outer legs 34. These outer legs are constructed and arranged similar to the legs 1 in Fig. 1. The legs 32 are provided intermediate their ends with outwardly bent loop portions 32ª, which portions are arranged to clip a clothesline, or other supporting device. The wire loop or staple 35, which fastens the legs 34 together, resiliently holds the jaws 34ª together and also resiliently forces the clothes-line gripping portions 32ª together.

I wish it to be understood that I do not desire to be limited to the exact details of construction shown and described, for obvious modifications will occur to a person skilled in the art.

I claim:

1. A fastening clip comprising a relatively flat resilient strip bent upon itself at its middle portion to form a pair of opposed resilient legs, said legs being provided adjacent their free extremities with opposite abruptly converging and diverging bent portions forming engaging pivot portions therebetween, a wire loop extending transversely around the outer sides of said legs for retaining said pivot portions in engagement, the extremities of the legs beyond said wire loop being freely separable and provided with complementary gripping portions comprising inwardly directed portions immediately adjacent said diverging portions and terminating in outwardly flared extremities, said wire loop normally forcing the gripping portions to engage each other resiliently, contraction of the portions of the legs between the pivot portions and the bent middle portion causing the legs to rock about the pivot portions and the free ends of the legs to be separated.

2. A fastening clip made of relatively thin resilient sheet metal and comprising a pair of opposed resilient legs connected at one end, said legs being provided adjacent their free extremities with opposed abruptly converging and diverging bent portions forming engaging pivot portions therebetween, the extremities of the legs beyond said pivot portions being freely separable and provided with complementary gripping portions comprising substantially coplanar ledges directed inwardly toward each other and forming with each other a substantially flat supporting shoulder, a wire loop extending transversely around the outer sides of the legs opposite the pivot portions for securing the legs together and normally forcing the gripping portions to engage each other resiliently for gripping objects, contraction of the portions of the legs between the pivot portions and the connected ends causing the legs to rock about the pivot portions and the free ends of the legs to be separated.

3. A fastening clip comprising a relatively flat resilient strip bent upon itself at its middle portion to form a pair of opposed resilient legs, said legs being provided adjacent their free extremities with opposed abruptly converging and diverging bent portions forming engaging pivot portions therebetween, the extremities of the legs beyond said pivot portion being freely separable and provided with complementary gripping portions comprising inwardly directed portions immediately adjacent said diverging portions, and securing means for retaining said pivot portions in engagement, said securing means normally forcing the gripping portions to engage each other resiliently, the portions of the legs between the pivot portions and the bent middle portion of the strip being resilient and contraction of said resilient portions causing the legs to rock about the pivot portions and the free ends of the legs to be separated.

FRANK R. CHESTER.

REFERENCES CITED

The following references are of record in the file of this patent:

UNITED STATES PATENTS

| Number | Name | Date |
|---|---|---|
| 67,100 | Brinkerhoff | July 23, 1867 |
| 128,934 | Wells | July 9, 1872 |
| 253,414 | Neal | Feb. 7, 1882 |
| 884,256 | Addie | Apr. 7, 1908 |
| 1,298,643 | Baum | Apr. 1, 1919 |
| 2,215,139 | Uhlmann | Sept. 17, 1940 |
| 2,116,386 | Copeland | May 3, 1938 |

FOREIGN PATENTS

| Number | Country | Date |
|---|---|---|
| 13,819 | Great Britain | of 1912 |
| 218,864 | Switzerland | Apr. 16, 1942 |
| 220,167 | Germany | Mar. 16, 1910 |
| 806,247 | France | Sept. 21, 1936 |